Oct. 16, 1928.

W. H. HIMES 1,687,668

BEARING

Filed June 23, 1925

WITNESSES:
R. S. Harrison
O. V. Buchanan

INVENTOR
Walter H. Himes
BY
Wesley G. Carr
ATTORNEY

Patented Oct. 16, 1928.

1,687,668

UNITED STATES PATENT OFFICE.

WALTER H. HIMES, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING.

Application filed June 23, 1925. Serial No. 39,000.

This invention relates to bearings and it has particular relation to the lubrication of journal bearings for electric motors adapted to be mounted with either a ceiling bracket, a floor bracket or a wall bracket.

The principal feature of my invention consists in the provision of a bearing bushing having preferably a plurality of perforated grooves, within which an annularly shaped wick is pressed by means of a steel garter spring embedded within the wick, whereby effective lubrication is provided regardless of the mounting of the motor, so long as the shaft remains substantially horizontal.

My invention will best be understood with reference to the accompanying drawing, wherein—

Figure 2:
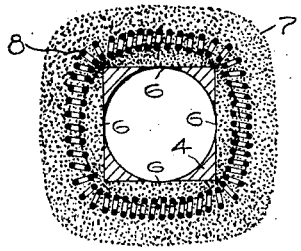
Fig. 2 is a view in transverse section through the wick, taken on the line II—II in Fig. 1.
Figure 3:
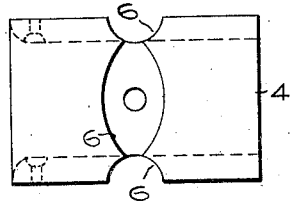
Fig. 3 is an elevational view of the bearing bushing.
Figure 4:
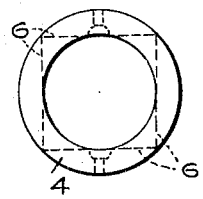
Fig. 4 is an end elevation of the bushing.
Figure 5:
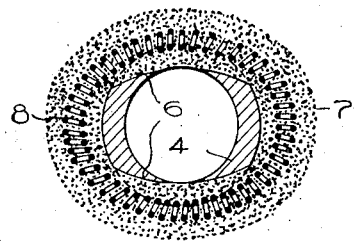
Fig. 5 is a view similar to Fig. 2, illustrating a modified construction.

As shown in the drawing, a fragment of the motor frame is indicated at 1, the parts illustrated being the end bracket of the motor, which is provided with a bearing housing 2. Disposed within an opening 3 in the bearing housing is a bearing bushing 4, in which is journaled the shaft 5 of the motor. The bushing is provided with a perforated groove, or preferably a plurality of perforated grooves 6 which are disposed in a single plane transverse to the bearing. In the embodiment of my invention shown in Fig. 2, four perforated grooves 6 are utilized, but in the equally successful construction shown in Fig. 5, two perforated grooves 6 are utilized.

Oil is fed to the journal, though the perforations in the groove 6 of the bushing, by means of an annular wick 7 which is formed by wrapping or braiding a quantity of wool waste around the coils of a steel garter spring 8. Instead of being braided directly on the spring, the wick material may be separately formed in tubular shape, after which the spring is inserted in place and joined together at the ends.

Figure 1:
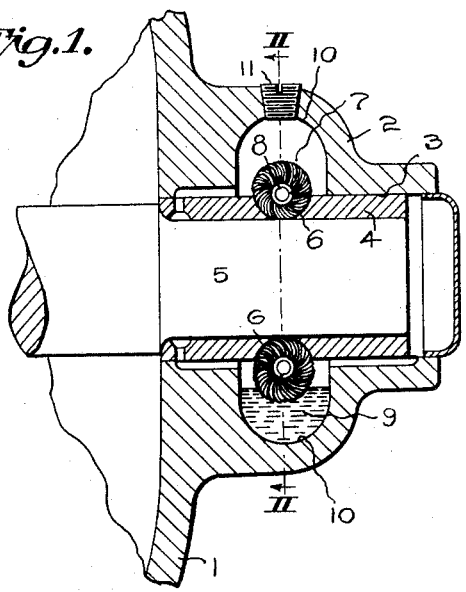
Fig. 1 is a longitudinal sectional view of the bearing assembly.

The wick ring 7 fits snugly around the bearing bushing and the fibers of the wick are pressed into the holes in the bushing by the action of the steel-spring center 8. The wick 7 projects into a body of oil or other lubricant 9, which is disposed within an annular oil-storing chamber 10 formed in the portion of the bearing housing surrounding the wick member. The oil chamber 10 may be refilled through one or more filling openings 11, as indicated in Fig. 1.

With the foregoing construction, remarkably long bearing life may be obtained in a bearing which operates equally well in all positions of the machine to which it is applied, so long as the shaft remains substantially horizontal.

I claim is my invention:

1. A horizontal-shaft machine adapted to be mounted on either the floor, wall or ceiling, and having a bearing comprising a perforated bearing-bushing sleeve, a bearing housing providing an annular lubricant-storing chamber surrounding said bushing sleeve in the plane of said perforation the annular lubricant-storing chamber being so shaped that it will hold lubricant at a substantially constant height with respect to the periphery of said bushing sleeve regardless of the mounting of said machine, and a lubricant-feeding means for conveying lubricant from said annular chamber to said perforation regardless of the mounting of said machine, said lubricant-feeding means comprising a garter spring surrounding said bushing sleeve and entirely wrapped with wick material of sufficient thickness to dip down into the said lubricant, whereby said shaft is lubricated without the possibility of a contact between the spring and the shaft.

2. A horizontal-shaft machine adapted to be mounted on either the floor, wall or ceiling, and having a bearing comprising a perforated bearing bushing sleeve, a bearing housing providing an annular lubricant-storing chamber surrounding said bushing sleeve in the plane of said perforation, the annular lubricant-storing chamber being so shaped that it will hold lubricant at a substantially constant height with respect to the periphery of said bushing sleeve regardless of the mounting of said machine, and a lubricant-feeding means for conveying lubricant from said annular chamber to said perforation regardless of the mounting of said machine, said lubricant-feeding means comprising a metallic coil garter spring surrounding said bushing sleeve and entirely wrapped with wick material of sufficient thickness to dip down into the said lubricant, whereby said shaft is lubricated without the possibility of a metal-to-metal contact between the spring and the shaft.

In testimony whereof, I have hereunto subscribed my name this 5th day of June, 1925.

WALTER H. HIMES.